United States Patent
Tominaga

(12) 
(10) Patent No.: US 6,684,817 B1
(45) Date of Patent: Feb. 3, 2004

(54) BREEDING NEST-FORMING STRUCTURE AND BREEDING HOUSING USING THE SAME FOR SMALL PET ANIMALS

(75) Inventor: Kazutoshi Tominaga, Osaka (JP)

(73) Assignee: Kabushiki Kaisha Tominaga Jyushi Kogyosho, Osaka (JP)

(*) Notice: Subject to any disclaimer, the term of this patent is extended or adjusted under 35 U.S.C. 154(b) by 0 days.

(21) Appl. No.: 10/383,510

(22) Filed: Mar. 10, 2003

(30) Foreign Application Priority Data

Nov. 12, 2002 (JP) .......................................... 2002-327987

(51) Int. Cl.⁷ ............................................... A01K 1/03
(52) U.S. Cl. ....................................................... 119/452
(58) Field of Search ................................. 119/421, 452, 119/473, 482

(56) References Cited

U.S. PATENT DOCUMENTS

| | | | | |
|---|---|---|---|---|
| 5,752,469 A | * | 5/1998 | Carbonell | 119/482 |
| 5,855,187 A | * | 1/1999 | Tominaga | 119/452 |
| 5,862,778 A | * | 1/1999 | Matsumoto | 119/472 |
| 5,881,676 A | * | 3/1999 | Brown et al. | 119/452 |
| 6,009,838 A | * | 1/2000 | Carver et al. | 119/452 |

FOREIGN PATENT DOCUMENTS

JP         10-56902         3/1998

* cited by examiner

Primary Examiner—Charles T. Jordan
Assistant Examiner—Elizabeth Shaw
(74) Attorney, Agent, or Firm—Armstrong, Kratz, Quintos, Hanson & Brooks, LLP

(57) ABSTRACT

A breeding housing for small pet animals includes a casing provided with at least a transparent front portion and a breeding nest-forming structure disposed in the casing. The nest-forming structure includes a lamination made of corrugated cardboard and provided with a nest-like space formed therein and an opening communicating with the nest-like space formed at one of four peripheral side surfaces of the lamination, and at least a part of the nest-like space constituting a front-opened portion opened at a front surface of the lamination. The nest-forming structure is disposed in the casing in such a state in which the opening faces upward and the front-opened portion faces a front of the casing. A surplus space is formed above the breeding nest-forming structure in the casing.

18 Claims, 4 Drawing Sheets

BREEDING NEST-FORMING STRUCTURE AND BREEDING HOUSING USING THE SAME FOR SMALL PET ANIMALS

BACKGROUND OF THE INVENTION

1. Field of the Invention

This invention relates to a breeding nest-forming structure for small pet animals such as rodents, e.g., hamsters or the like, and also relates to a breeding housing using the breeding nest-forming structure.

2. Description of Related Art

Generally, in breeding small pet animals such as hamsters, a breeding housing such as a cage or a molded plastic container has been commonly used. In the housing, a small house, an exercise wheel, a feeding dish, a water bottle, an excretion tray or the like are typically provided. Rodents such as hamsters inherently have natural characteristics or habits of making a nest-hole under the ground and inhabiting therein, i.e., sleeping, eating, excreting and the like. Conventional breeding housings, however, provide hamsters with unnatural breeding environments far from their inherent nest-life habits. This causes stress to hamsters, which in turn may cause disease or lead to early death. Furthermore, from the viewpoint of breeders, it is impossible to observe their inherent nest-life. In addition, since hamsters have nocturnal habits and therefore tend to stay in the house in the daytime, such habits prevent us from observing their acts. Especially, since hamsters tend to spend most of their time in the house during the daytime because of its nocturnal habit, it is very difficult to observe their lovely behavior and/or sleeping style as long as they are in the house.

The applicant proposed a breeding housing for small pet animals such as rodents comprising a casing and an underground passage-forming member disposed in the casing (Japanese Unexamined Patent Publication No. H10-56902A).

This proposed breeding housing for small pet animals includes a main casing having a front opening, an underground passage-forming member having a front-opened underground passage portion formed like a nest-hole and disposed in the main casing and a transparent front panel attached to the main casing so as to close the front-opened underground passage portion. As the underground passage-forming member, a molded plastic article including inorganic powder filler is used. According to such a breeding housing, rodents such as hamsters can go up to the upper surface of the ground passage-forming member as a ground from the underground passage portion formed like a nest-hole and vice-versa, and can enjoy the inherent nest-hole life in the underground passage-forming member with less stress because the breeding housing can provide breeding environments in conformity to their inherent habits. Furthermore, breeders can observe hamsters' behavior or actions in the underground passage portion through the transparent front panel and enjoy their behavior and/or sleeping style.

However, the underground passage-forming member for the aforementioned previously proposed breeding housing is a relatively large synthetic resign molded article. Therefore, the cost of manufacturing the forming die and the material costs become expensive. Especially, in cases where a plurality of underground passage-forming members different in pattern are manufactured, the costs will increase since respective forming dies are required. Furthermore, since such an underground passage-forming member becomes contaminated by bodily wastes and/or leftover meals, it is required to clean it periodically. However, it was troublesome to clean the underground passage-forming member having a complex passage.

On the other hand, since rodents such as hamsters prefer to gnaw articles, the aforementioned molded plastic article forming the underground passage-forming member is strengthened by mixing inorganic powder filler into the plastic. However, this restricts the gnawing instinct of rodents, which in turn gives rodents stress. Furthermore, rodents have habits of making a nest in the ground by gathering fiber materials. Therefore, in case of using the aforementioned proposed breeding housing, it is required to put nest materials therein in accordance with their habits. This requires costs and labor.

It is an object of the present invention to provide a breeding nest-forming structure capable of providing breeding environments close to the inherent native habitat of rodents such as hamsters in accordance with their living habits and a breeding housing using the breeding nest-forming structure.

It is another object of the present invention to provide various breeding nest-forming structures different in nest-hole pattern which can be manufactured at low cost and decrease the breeding labor and a breeding housing using the breeding nest-forming structure.

Other objects and advantages of the present invention will become apparent from the description of the preferred embodiments, which may be modified in any manner without departing from the scope and spirit of the invention.

SUMMARY OF THE INVENTION

According to one aspect of the present invention, a breeding nest-forming structure comprises a lamination made of corrugated cardboard, wherein the lamination is provided with a nest-like space formed therein and an opening communicating with the nest-like space formed at one of four peripheral side surfaces of the lamination, and wherein at least a part of the nest-like space constitutes a front-opened portion opened at a front surface of the lamination.

In the nest-forming structure, since inexpensive corrugated cardboard is used as the materials and a forming die, which is required to make a plastic molded article, is not required, various different types of nest-forming structures can be manufactured at very low cost. For rodents such as hamsters, it is easy to obtain nest materials by gnawing the corrugated cardboard and change the nest shape. Furthermore, the nest-forming structure is light in weight and excellent in thermal insulation and warmth retaining property. Since the nest-forming structure is made of paper materials, no disposal problem after use will occur.

It is preferable that the lamination is made by integrally securing a plurality of corrugated cardboard each having a punched nest-like space forming aperture. In this case, the nest-like space forming operation can be performed easily as compared with the case in which a nest-like space is formed by boring a nest-hole space in a previously prepared lamination. Furthermore, a complex nest-hole pattern, which is difficult to form by the aforementioned boring processing, can be formed arbitrarily, and it becomes possible to change a nest-hole pattern by simply changing the combination of punched corrugated cardboard having different punched apertures.

According to another aspect of the present invention, a breeding housing for small pet animals comprises a casing provided with at least a transparent front portion and a breeding nest-forming structure disposed in the casing, wherein the nest-forming structure includes a lamination made of corrugated cardboard, the lamination being provided with a nest-like space formed therein and an opening communicating with the nest-like space formed at one of four peripheral side surfaces of the lamination, and at least a part of the nest-like space constituting a front-opened portion opened at a front surface of the lamination, wherein the nest-forming structure is disposed in the casing in such a state in which the opening faces upward and the front-opened portion faces a front of the casing, and wherein a surplus space is formed above the nest-forming structure in the casing.

With this breeding housing, small pet animals such as rodents, e.g., hamsters, can enjoy the nest life in the nest-like space formed in the nest-forming structure. Furthermore, for the small pet animals, it is possible to freely utilize the surplus space above the nest-forming structure as a ground space, move in and out the nest-like space, obtain nest-forming materials by gnawing the corrugated cardboard constituting the nest-forming structure and/or change the nest shape. Accordingly, a breeding environment in conformity to their inherent habits can be provided, casing less stress to small pet animals. Furthermore, since the opened nest-like space is exposed to the outside through the transparent front portion of the casing, the life style of the small pet animals can be observed. In addition, since the nest-forming structure is inexpensive as mentioned above, by simply replacing a contaminated and/or heavily deformed nest-forming structure with a new one, the labor for breeding administration can be lessened.

In this breeding housing, it is preferable that a part of the nest-like space in the nest-forming structure constitutes a nest chamber which cannot be seen from the outside of the casing. In this case, since small pet animals in the breeding housing can utilize the nest chamber at the time of sleeping while avoiding human eyes and/or external light, more comfortable living environments with less stress can be provided.

Furthermore, it is preferable that the transparent front portion of the casing is a panel attached to a front-opening of a front-opened main casing in a detachable manner or in an openable and closable manner. In this case, the cleaning of the nest-like space can be easily performed by detaching or opening the panel. Furthermore, it is preferable that the casing has an upper portion with a flattened cylindrical handle portion extending in a fore-and-aft direction of the casing and that the flat cylindrical handle portion constitutes a ventilating opening of the casing. In this case, the carrying of the breeding housing can be performed easily, and the ventilation can be performed through the ventilation opening.

It is preferable that the casing has an upper portion with a tunnel pipe connecting portion. In this case, since the small pet animals in the breeding housing can come and go between a plurality of breeding housings through tunnel pipes connecting the breeding housings, resulting in an expanded living area for small pet animals. In case of forming a tunnel pipe connecting portion in the side portion of the housing, it is preferable that the breeding nest-forming structure disposed in the casing is provided with a side opening which communicates with the nest-like space and faces the tunnel pipe connecting portion.

It is preferable that the casing is formed into a rectangular parallelepiped shape with a smaller thickness in a fore-and-aft direction of the casing, wherein the casing has a foot longer than the thickness of the casing, wherein the foot is rotatably connected to a bottom portion of the casing so that the foot can take a pulled out position along the fore-and-aft direction of the casing and a drawn back position along a right-and-left direction of the casing. In this case, the foot taking the pulled out position enables the casing to stand stably. On the other hand, in the drawn back position, the breeding housing can be conveniently stored or carried in a compact manner.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other. embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

Figure 1:
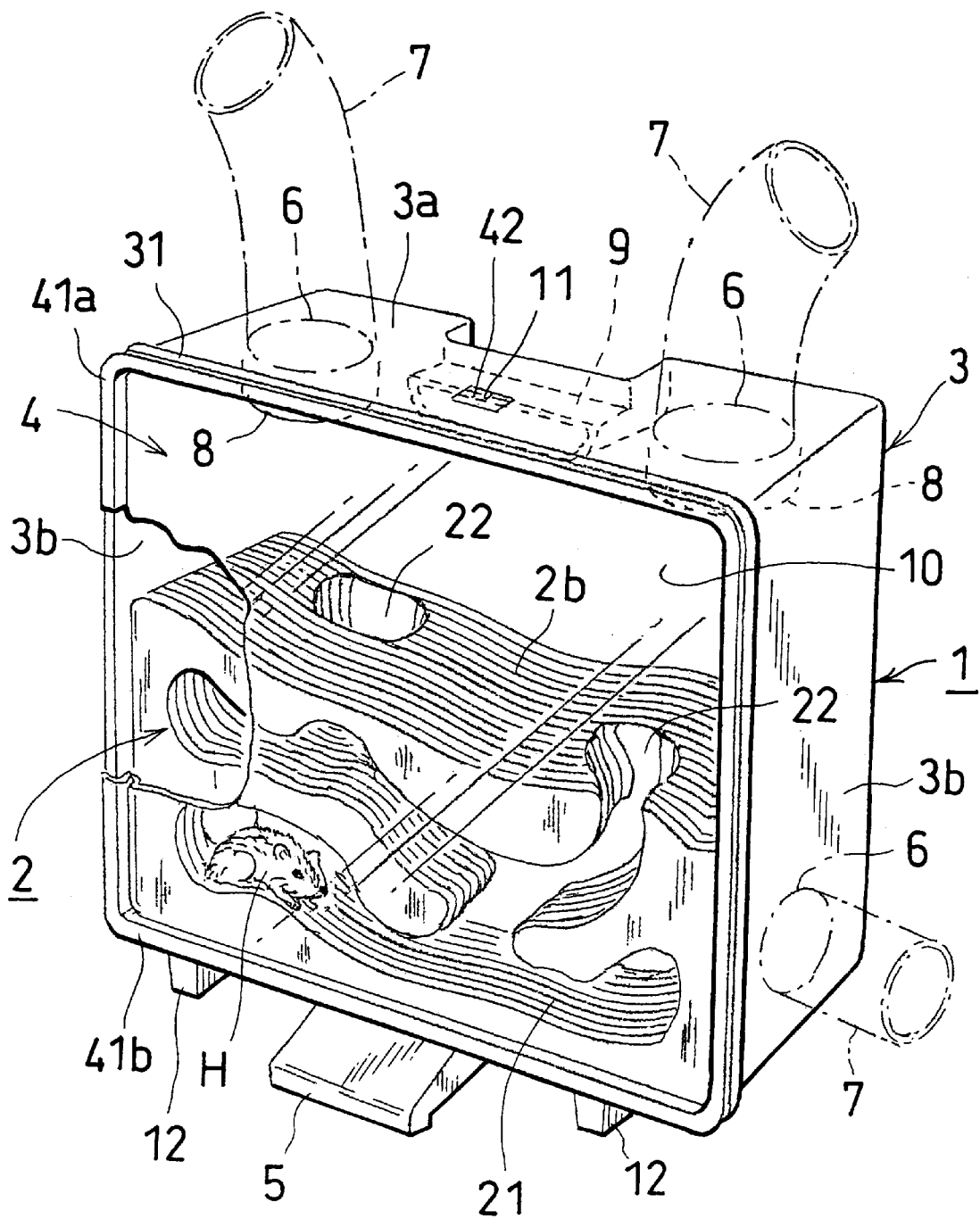
FIG. 1 shows a perspective view of a breeding housing of an embodiment according to the present invention.
Figure 2:
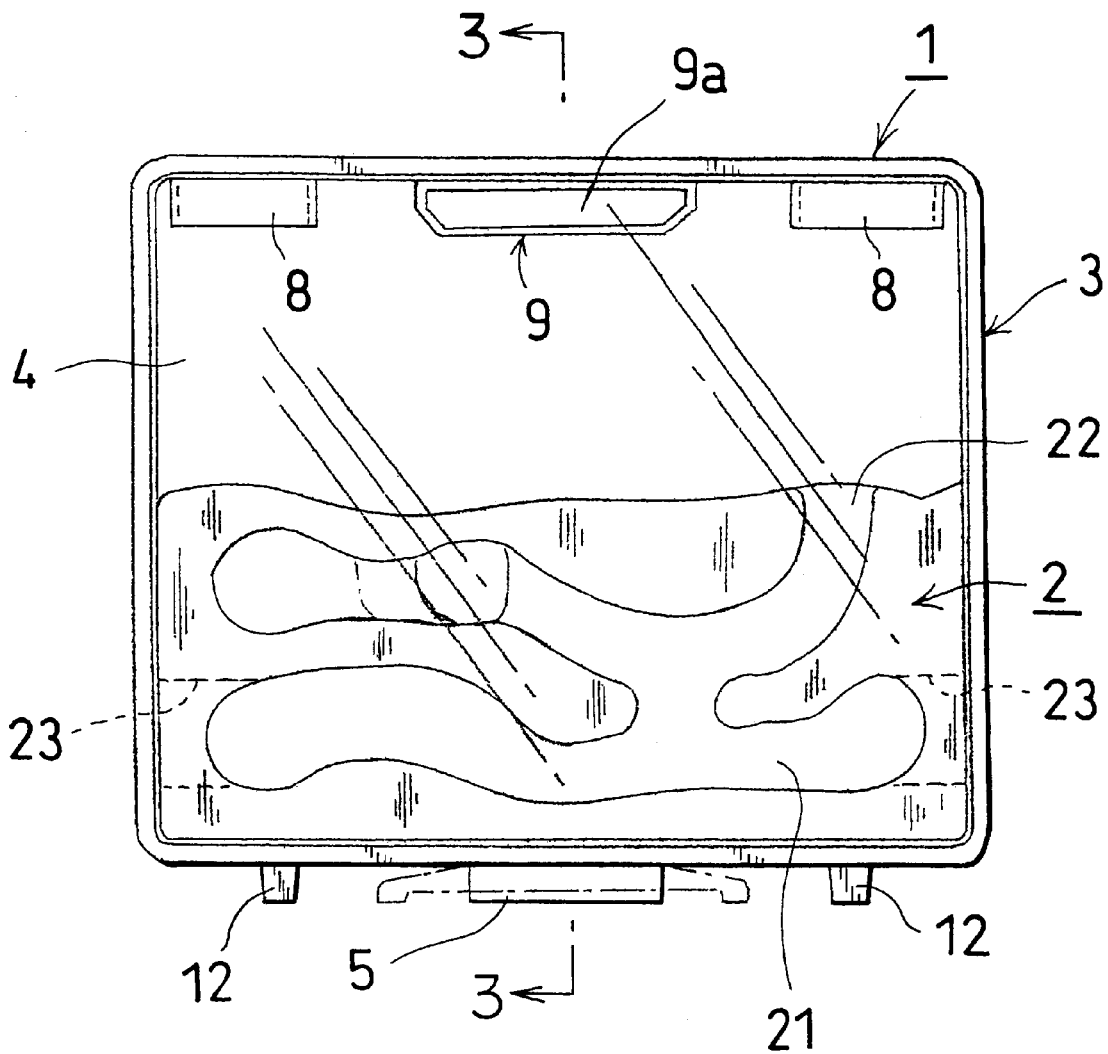
FIG. 2 shows a front view of the breeding housing shown in FIG. 1.
Figure 3:
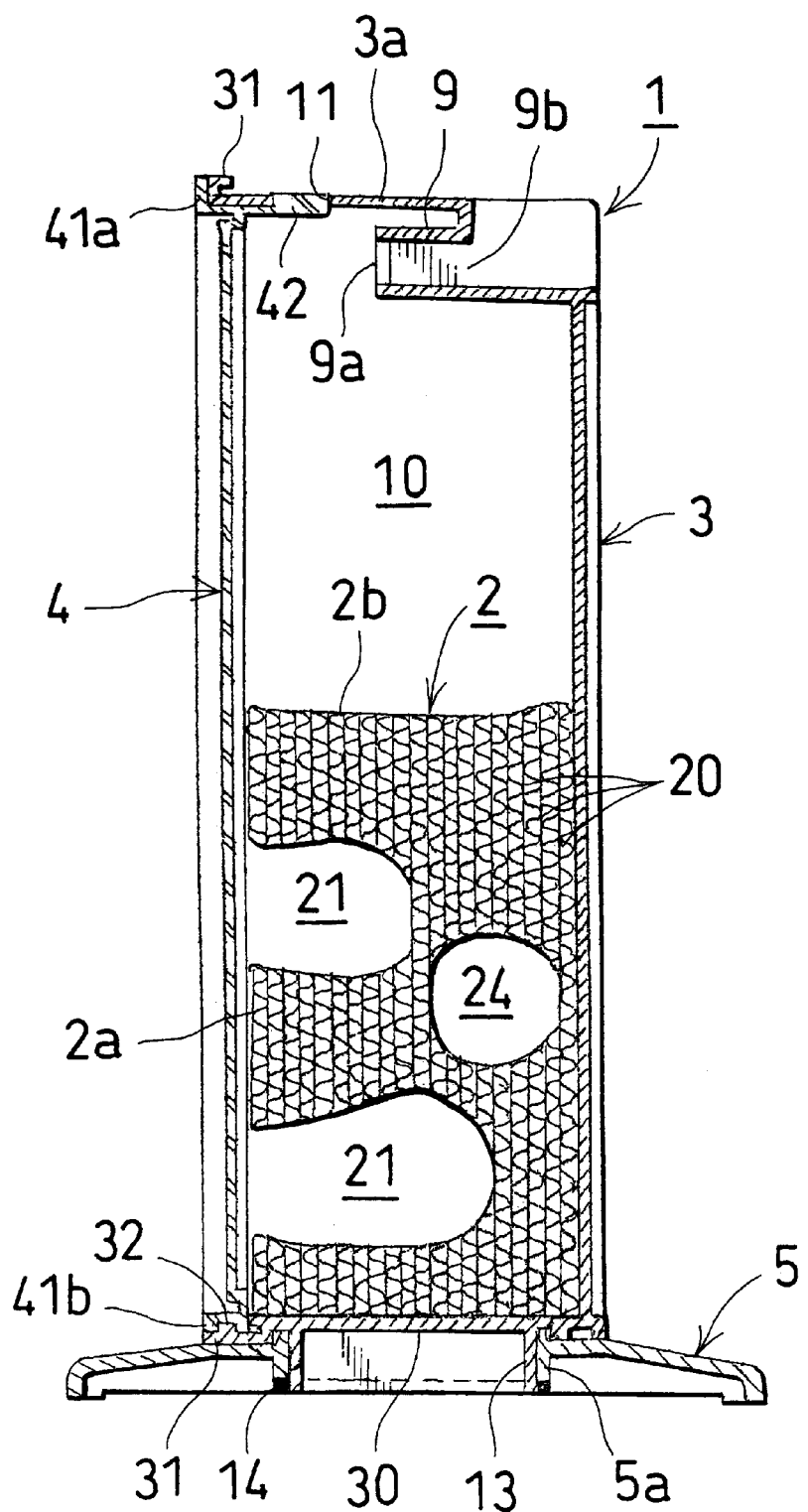
FIG. 3 shows an enlarged cross-sectional view taken along the line 3—3 in FIG. 2.
Figure 4:
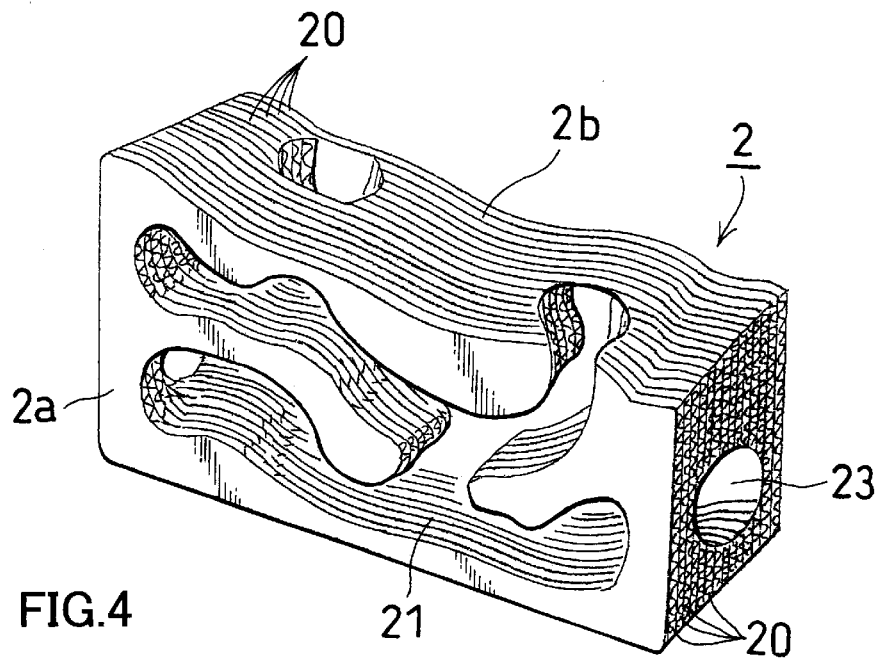
FIG. 4 shows a perspective view showing the breeding nest-forming structure to be used in the breeding housing shown in FIG. 1.
Figure 5:
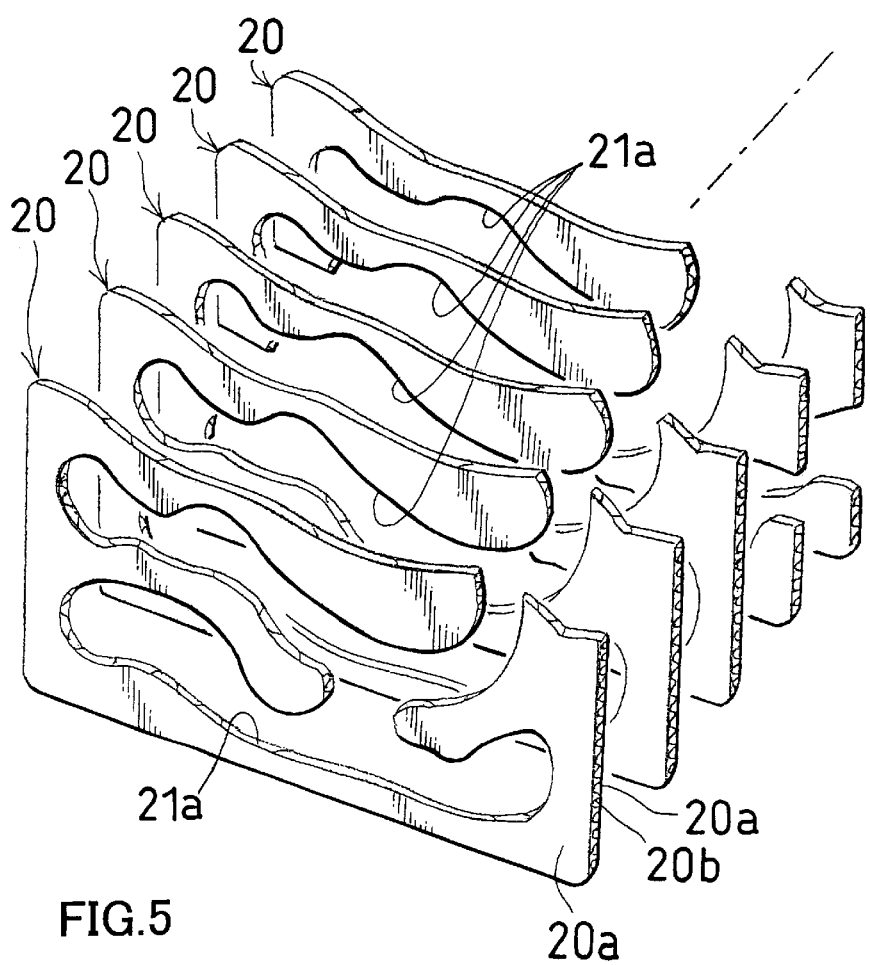
FIG. 5 shows a perspective view showing some corrugated cardboard constituting the nest-forming structure.

Preferred embodiments according to the present invention will now be described in detail, with reference to the accompanying drawings. FIGS. 1–3 show a breeding housing for small pet animals, and FIGS. 4 and 5 show a breeding nest-forming structure to be used in the breeding housing.

This breeding casing for small pet animals is use for breeding rodents such as hamsters. In the casing 1 formed into a rectangular parallelepiped shape with a small thickness in the fore-and-aft direction of the casing, a breeding nest-forming structure 2 is disposed in a state in which a surplus space 10 is formed above the breeding nest-forming structure 2. The casing 1 includes a front-opened transparent main casing 3 made of an integral plastic formed article, a transparent and colorless front panel 4 made of an integral plastic molded article fitted to the front-opening of the main casing 3 and a foot member 5 attached to the lower central portion of the main casing 3.

The main casing 3 is provided with circular easy-to-broke portions 6 made of narrow grooves or discontinued slits at the right and left side portion of the upper wall 3a and the lower portion of the right and left side walls 3b. By removing the circular portion surrounded by the circular easy-to-broke portion 6, an end portion of a tunnel pipe 7 can be inserted in the formed circular opening. On the inner surface of the upper wall 3a, a pair of short cylindrical portions 8 and 8 surrounding the circular easy-to-broke portions 6 are downwardly protruded. Furthermore, at the widthwise central portion of the upper wall 3a, a flattened cylindrical portion 9 extending in the fore-and-aft direction of the casing 1 is integrally formed so as to protrude into the inside of the casing 1 from the rear side thereof. The front and rear ends 9a and 9b are opened and constitute ventilating openings. Furthermore, the flattened cylindrical portion 9 is designed such that a user can insert his or her fingers into the cylindrical portion 9. At the position of the upper wall in front of the flattened cylindrical portion 9, a rectangular engaging aperture 11 is provided.

Furthermore, on the lower wall 3c of the main casing 3, a pair of right and left fixed legs 12 and 12 and a central circular protruded portion 13 are protruded downwardly. A foot member 5 is attached to the circular protruded portion 13 undetachably and rotatably by outwardly fitting the cylindrical portion 5a formed at the longitudinal central portion of the foot member 5 on the circular protruded portion 13 and securing a pull-out-prevention member 14 to the circular protruded portion 13 at the lower portion of the cylindrical portion 5a. The foot member 5 has a length longer than the size of the casing 1 in the fore-and-aft direction of the casing 1 and a width smaller than the size of the casing 1 in the fore-and-aft direction of the casing 1. Accordingly, as shown in FIG. 3, when the foot member 5 takes a position along the fore-and-aft direction of the casing 1, both ends thereof protrude from the front and rear side of the casing 1. On the other hand, when the foot member 5 takes a position along the right-and-left direction of the casing 1, the entire portion of the foot member 5 is disposed beneath the casing 1. Furthermore, at the front peripheral edge 31 of the main casing 3, an engaging protruded ridge 32 is formed.

The front panel 4 is made of transparent resin such as acrylic resin, and is provided with a forwardly protruded peripheral portion 41 protruded from the peripheral edge of the square flat portion 40. The upper and right and left peripheral portions 41a are formed into an L-shaped cross-sectional configuration respectively, and the lower peripheral portion 41b is formed into a U-shaped cross-sectional configuration. At the central position of the upper peripheral edge, an engaging ledge 42 extending rearward and having an upwardly protruded tip end portion is integrally formed.

This front panel 4 can be fitted to the front-opened portion of the main casing 3 by engaging the lower peripheral edge 41b of the panel 4 with the protruded ridge 32 of the main casing 3 in a forwardly inclined state and then pivoted about the protruded ridge as a fulcrum toward the upright position to inwardly engage the upper and side peripheral portions 41a with the front peripheral edge 31. As a result, the tip end portion of the engaging ledge 42 engages with the engaging aperture 11 of the upper wall 3a of the main casing 3, whereby the panel 4 is immovably fitted to the main casing 3. The front panel 4 can be detached from the main casing 3 by pressing the tip end portion of the engaging ledge 42 engaged with the engaging aperture 11 downward with fingers or the like to disengage the engaging ledge 42 from the engaging aperture 11 and then pulling up the panel in an inclined state.

The breeding nest-forming structure 2 is made of a lamination of corrugated cardboard. As best shown in FIG. 4, the nest-forming structure 2 has a front-opened nest-like space 21 at the front face 2a thereof, openings 22 and 22 communicating with the nest-like space 21 at one side surface 2b of the peripheral four side surfaces, i.e., the upper side surface, openings 23 and 23 communicating with the nest-like space 21 at the right and left side surfaces. The nest-like space 21 extends in the up-and-down directions and in the right-and-left directions, and has a nest chamber 24 (see FIG. 3) which is not exposed to the outside.

As shown in FIG. 5, the nest-forming structure 2 is made by integrally securing a plurality of corrugated cardboard 20 each having a punched nest-like space forming aperture 21a. Each corrugated cardboard 20 has a structure in which a corrugated paper board 20b is sandwiched by and between two flat paper board 20a and 20a and adhered thereto.

This nest-forming structure 2 is disposed in the casing 1 with the opened side of the nest-forming structure 2 facing the front side of the casing 1. In this state, the opened side of the nest-forming structure 2 is closed by the front panel 4 of the casing 1, and the right and left side openings 23 and 23 face the respective easy-to-broke portions 6 and 6 formed in the side walls 3b and 3b of the casing 1.

According to the aforementioned breeding casing for small pet animals, rodents such as hamsters H are willing to enter the nest-like space 21 formed in the nest-forming structure 2 and can enjoy the nest life therein. Furthermore, the rodents can move in and out the nest-like space 21, obtain nest-forming materials by gnawing the corrugated cardboard 20 constituting the nest-forming structure 2 and/or change the nest shape. Accordingly, the rodents can fully exert their inherent habits, and therefore can spend comfortable life with less stress. Furthermore, since the corrugated board lamination constituting the nest-forming structure 2 has excellent thermal insulation characteristics by a large amount of air layers formed in the lamination, it is possible to avoid excessive low temperature in the nest-like space 21 in winter and excessive high temperature in the nest-like space 21 in summer, resulting in preferable breeding environments.

The front-opened nest-like space 21 is exposed to the outside via the transparent front panel 4. Therefore, hamsters' nest living as well as their lovely sleeping style/acting can be zoologically observed in detail through the transparent front panel 4. Furthermore, since the breeding environments are close to the natural state, it is possible to utilize this housing from the academic viewpoint of zoological observation.

Furthermore, since this nest-forming structure 2 made of corrugated cardboard 20 is inexpensive and therefore can be used as disposable goods, it is possible to replace the contaminated and/or heavily deformed nest-forming structure 2 with a new one, which lessens the labor for breeding administration. Furthermore, since the nest-forming structure 2 is made of paper materials and therefore they can be burned, disposal problems, which occur in plastic materials, will not occur. In addition, since this nest-forming structure 2 is very light in weight, it is easy to handle and carry the breeding casing 1 in which the nest-forming structure 2 is disposed.

In cases where an unexposed nest chamber 24 is formed in the nest-forming structure 2, small pet animals such as hamsters H can utilize the nest chamber as a space where hamsters H can rest while avoiding human eyes and/or external light. Thus, stress due to the exposure to the human eyes or light can be avoided, whereby very comfortable living environments can be provided. This nest chamber 24 can be a space that will not be exposed to the outside when the nest-forming structure 2 is disposed in the casing 1. Therefore, the nest chamber 24 is not always required to be closed to the front and rear surfaces of the casing 1 and may be opened to the rear main surface opposite to the nest-like space 21 if the main casing 3 is opaque, preferably dark colored.

When the circular wall portion surrounding by the easy-to-broke portion 6 formed in the upper wall 3a and side walls 3b of the casing 1 is removed and a tunnel pipe 7 is inserted therein to connect a plurality of breeding casings, small pet animals such as hamsters H can travel through the tunnel pipe 7. Thus, the life area for hamsters H can be expanded.

On the other hand, since the transparent front portion of the casing 1 is made of a panel detachably attached to the main casing 3, it is easy to clean the casing 1 and put small pet animals and/or equipment in and out the casing 1. Although the casing 1 is formed into a rectangular parallelepiped shape with a smaller thickness in the fore-and-aft direction of the casing 1, the casing 1 can be used in a stable upright position by disposing the foot member 5 in the fore-and-aft direction of the casing 1, while the casing 1 can be carried/stored in a compact manner by disposing the foot member 5 in the right-and-left direction of the casing 1. Furthermore, since the upper wall 3a of the casing 1 is provided with the flattened cylindrical portion 9 as a finger-insertion type handle, the casing 1 can be easily carried by using the handle. The front and rear opened ends 9a and 9b of the flattened cylindrical portion 9 constitute ventilations by which the casing 1 can be ventilated and maintained in a well ventilated condition. Therefore, there is no concern that small pet animals are short of oxygen.

Although the nest-like space 21 in the nest-forming structure 2 can be formed by boring a corrugated cardboard lamination as mentioned above, such a nest-like space 21 can be more easily formed by forming a punched nest-like space forming aperture 21a in each corrugated cardboard 20 and then integrally securing these punched corrugated cardboard. Especially, a complex nest pattern including the closed nest chamber 24 is difficult to form by boring the corrugated cardboard lamination, but can be easily formed by punching each corrugated cardboard and then securing them. Furthermore, it is possible to change a nest pattern by combining corrugated cardboard 20 different in, punched nest-like space forming aperture 21a.

The breeding casing for small pet animals according to the present invention is not limited to the aforementioned embodiment, and can be changed in various manners. For instance, as for the front panel 4, in place of the detachable type panel, it may be an openable and closable panel pivoted to the main casing 3. Furthermore, a light shielding plate (not shown) may be detachably disposed in front of the front panel 4 to darken the nest-like space 20 and comfort the small pet animals when they are not observed. As for the casing 1, in place of the flat configuration as mentioned above, the casing 1 may have a larger size in the fore-and-aft direction thereof so as to keep an inner space at the rear side of the nest-forming structure 2. Furthermore, the casing 1 may have an openable and closable opening at portions other than the front portion so that foods and/or instruments can be put in and out therethrough. The mounting structure of the foot member 5 may be changed arbitrarily in place of the illustrated structure. The pattern of the nest-like space 20 in the nest-forming structure 2, the number of openings, the arranging direction of the corrugated cardboard 20b (direction of the wave), etc. are not specifically limited. Although the small pet animals to be bred in the breeding housing are commonly rodents such as mice, guinea pigs or rabbits as well as hamsters H, the breeding casing may also be applied to another various small pet animals having habits using nests.

According to one aspect of the present invention, a breeding nest-forming structure comprises a lamination made of corrugated cardboard, wherein the lamination is provided with a nest-like space formed therein and an opening communicating with the nest-like space formed at one of four peripheral side surfaces of the lamination, and wherein at least a part of the nest-like space constitutes a front-opened portion opened at a front surface of the lamination. Therefore, by disposing the nest-forming structure in a breeding casing, an underground portion where small pet animals can enjoy the nest-hole life can be formed. Furthermore, the small pet animals can go in and out the underground and the ground via the opening, and also can make nest-forming materials or change the nest-hole by gnawing the corrugated cardboard. Thus, breeding environments in conformity to the inherent habits to rodents such as hamsters can be provided. In addition, a forming die, which is required to make a plastic molded article, is not required to manufacture the nest-forming structure, and various nest-forming structures different in nest-hole pattern can be manufactured at low cost. The nest-forming structure is light in weight and easy to carry. Furthermore, since the nest-forming structure is excellent in thermal insulation, it is possible to avoid excessive low temperature in the nest-like space in winter and excessive high temperature in the nest-like space in summer, resulting in preferable breeding environments. In addition, since the nest-forming structure is made of paper materials, no disposal problem after use occurs.

The lamination may be made by integrally securing a plurality of corrugated cardboard each having a punched nest-like space forming aperture. In this case, the nest-like space forming operation can be performed easily as compared with the case in which a nest-like space is formed by boring a nest-hole space in a previously prepared lamination. Furthermore, a complex nest-hole pattern, which is difficult to form by the aforementioned boring processing, can be formed arbitrarily, and it becomes possible to change a nest-hole pattern by simply changing the combination of punched corrugated cardboard having different punched apertures.

According to another aspect of the present invention, a breeding housing for small pet animals comprises a casing provided with at least a transparent front portion and a breeding nest-forming structure disposed in the casing, wherein the nest-forming structure includes a lamination made of corrugated cardboard, the lamination being provided with a nest-like space formed therein and an opening communicating with the nest-like space formed at one of four peripheral side surfaces of the lamination, and at least a part of the nest-like space constituting a front-opened portion opened at a front surface of the lamination, wherein the nest-forming structure is disposed in the casing in such a state in which the opening faces upward and the front-opened portion faces a front of the casing, and wherein a surplus space is formed above the breeding nest-forming structure in the casing. With this breeding housing, small pet animals such as rodents, e.g., hamsters, can enjoy the nest life in the nest-like space formed in the nest-forming structure. Furthermore, for the small pet animals, it is possible freely to utilize the surplus space above the nest-forming structure as a ground space, move in and out the nest-like space, obtain nest-forming materials by gnawing the corrugated cardboard constituting the nest-forming structure and/or change the nest shape. Accordingly, a breeding environment in conformity to their inherent habits can be provided, casing less stress to the small pet animals.

In this breeding casing, since the opened nest-like space is exposed to the outside via the transparent panel, a hamster's nest living as well as their lovely sleeping style/acting can be zoologically observed in detail through the transparent panel. Furthermore, since the breeding environments are close to the natural state, it is possible to utilize the breeding casing from the academic viewpoint of zoological observation. In addition, since the nest-forming structure is made of inexpensive corrugated cardboard, by simply replacing a contaminated and/or heavily deformed nest-forming structure with a new one, the labor for breeding administration can be lessened. Furthermore, since the nest-forming structure is light in weight, it is possible to carry the entire breeding casing.

In the breeding housing, a part of the nest-like space in the breeding nest-forming structure may constitute a nest chamber which cannot be seen from the outside of the casing. In this case, since the small pet animals in the breeding housing can utilize the nest chamber at the time of sleeping while avoiding human eyes and/or external light, more comfortable living environments with less stress can be provided.

Furthermore, the transparent front portion of the casing may be a panel attached to a front-opening of a front-opened main casing in a detachable manner or in an openable and closable manner. In this case, the cleaning of the nest-like space can be easily performed by detaching or opening the panel.

Furthermore, the casing may have an upper portion with a flattened cylindrical handle portion extending in a fore-and-aft direction of the casing and the flat cylindrical handle portion constitutes a ventilating opening of the casing. In this case, the carrying of the breeding housing can be performed easily, and the ventilation can be performed through the ventilation opening. Therefore, there is no concern that small pet animals are short of oxygen.

The casing may have an upper portion with a tunnel pipe connecting portion. In this case, the living area for the small pet animals can be expanded into a plurality of breeding casings by connecting a plurality of breeding casings via tunnel pipes.

In the breeding casing, a tunnel pipe connecting portion may be formed in the side portion of the housing, and the breeding nest-forming structure disposed in the casing may be provided with a side opening which communicates with the nest-like space and faces the tunnel pipe connecting portion. In this case, by connecting the side portions of a plurality of breeding casings via tunnel pipes, small pet animals can go in and out the nest-like spaces of the plurality of breeding casings via the tunnel pipes.

In a casing formed into a rectangular parallelepiped shape with a smaller thickness in a fore-and-aft direction of the casing, the casing may have a foot longer than the thickness of said main casing, wherein the foot is rotatably connected to a bottom portion of the casing so that the foot can take a pulled out position along the fore-and-aft direction of the casing and a drawn back position along a right-and-left direction of the main casing. In this case, the foot taking the pulled out position enables the main casing to stand stably. On the other hand, in the drawn back position, the breeding housing can be conveniently stored or carried in a compact state.

In this specification, the terminology "breeding" is intended to encompass all normal activities of a pet and is not used merely in a reproductive sense.

While illustrative embodiments of the present invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

This application claims priority to Japanese Patent Application No. 2002-327987 filed on Nov. 12, 2002, the disclosure of which is incorporated by reference in its entirety.

The terms and expressions which have been employed herein are used as terms of description and not of limitation, and there is no intent, in the use of such terms and expressions, of excluding any equivalents of the features shown and described or portions thereof, but it should be recognized that various modifications are possible within the scope of the invention claimed.

What is claimed is:

1. A breeding nest-forming structure, comprising:
   a lamination made of corrugated cardboard,
   wherein said lamination is provided with a nest-like space formed therein and an opening communicating with said nest-like space formed at one of four peripheral side surfaces of said lamination, and
   wherein at least a part of said nest-like space constitutes a front-opened portion opened at a front surface of said lamination.

2. The breeding nest-forming structure as recited in claim 1, wherein said lamination is made by integrally securing a plurality of corrugated cardboard each having a punched nest-like space forming aperture.

3. A breeding housing for small pet animals, comprising:
   a casing provided with at least a transparent front portion; and
   a breeding nest-forming structure disposed in said casing,
   wherein said nest-forming structure includes a lamination made of corrugated cardboard, said lamination being provided with a nest-like space formed therein and an opening communicating with said nest-like space formed at one of four peripheral side surfaces of said lamination, and at least a part of said nest-like space constituting a front-opened portion opened at a front surface of said lamination,
   wherein said nest-forming structure is disposed in said casing in such a state in which said opening faces upward and said front-opened portion faces a front of said casing, and
   wherein a surplus space is formed above said breeding nest-forming structure in said casing.

4. The breeding housing for small pet animals as recited in claim 3, wherein said lamination is made by integrally securing a plurality of corrugated cardboard each having a punched nest-like space forming aperture.

5. The breeding housing for small pet animals as recited in claim 3, wherein a part of said nest-like space in said breeding nest-forming structure constitutes a nest chamber which cannot be seen from the outside of said casing.

6. The breeding housing for small pet animals as recited in claim 3, wherein said transparent front portion of said casing is a panel attached to a front-opening of a front-opened main casing in a detachable manner.

7. The breeding housing for small pet animals as recited in claim 3, wherein said transparent front portion of said casing is a panel attached to a front-opening of a front-opened main casing in an openable and closable manner.

8. The breeding housing for small pet animals as recited in claim 3, wherein said casing has an upper portion with a flattened cylindrical handle portion extending in a fore-and-aft direction of said casing, said flat cylindrical handle portion constituting a ventilating opening of said casing.

9. The breeding housing for small pet animals as recited in claim 3, wherein said casing has an upper portion with a tunnel pipe connecting portion.

10. The breeding housing for small pet animals as recited in claim 3, wherein said casing has a side portion with a tunnel pipe connecting portion, wherein said breeding nest-forming structure disposed in said casing is provided with a side opening which communicates with said nest-like space and faces said tunnel pipe connecting portion.

11. The breeding housing for small pet animals as recited in claim 3, wherein said casing is formed into a rectangular parallelepiped shape with a smaller thickness in a fore-and-aft direction of said casing, wherein said casing has a foot longer than said thickness of said main casing, wherein said foot is rotatably connected to a bottom portion of said casing so that said foot can take a pulled out position along the fore-and-aft direction of said casing and a drawn back position along a right-and-left direction of said main casing.

12. A breeding housing for small pet animals, comprising:
a casing provided with a transparent front portion; and
a breeding nest-forming structure disposed in said casing,
wherein said nest-forming structure includes a lamination made of corrugated cardboard, said lamination being provided with a nest-like space formed therein and an opening communicating with said nest-like space formed at a peripheral side surface of said lamination, and at least a part of said nest-like space constituting a front-opened portion opened at a front surface of said lamination,
wherein said nest-forming structure is disposed in said casing with said opening facing upward and said front-opened portion facing a front of said casing,
wherein a surplus space is formed above said breeding nest-forming structure in said casing,
wherein said lamination is made by integrally securing a plurality of corrugated cardboard each having a punched nest-like space forming aperture, and
wherein a part of said nest-like space in said breeding nest-forming structure constitutes a nest chamber which cannot be seen from the outside of said casing.

13. The breeding housing for small pet animals as recited in claim 12, wherein said transparent front portion of said casing is a panel attached to a front-opening of a front-opened main casing in a detachable manner.

14. The breeding housing for small pet animals as recited in claim 13, wherein said transparent front portion of said casing is a panel attached to a front-opening of a front-opened main casing in an openable and closable manner.

15. The breeding housing for small pet animals as recited in claim 14, wherein said casing has an upper portion with a flattened cylindrical handle portion extending in a fore-and-aft direction of said casing, said flat cylindrical handle portion constituting a ventilating opening of said casing.

16. The breeding housing for small pet animals as recited in claim 15, wherein said casing has an upper portion with a tunnel pipe connecting portion.

17. The breeding housing for small pet animals as recited in claim 16, wherein said casing has a side portion with a tunnel pipe connecting portion, wherein said breeding nest-forming structure disposed in said casing is provided with a side opening which communicates with said nest-like space and faces said tunnel pipe connecting portion.

18. The breeding housing for small pet animals as recited in claim 17, wherein said casing is formed into a rectangular parallelepiped shape with a smaller thickness in a fore-and-aft direction of said casing, wherein said casing has a foot longer than said thickness of said main casing, wherein said foot is rotatably connected to a bottom portion of said casing so that said foot can take a pulled out position along the fore-and-aft direction of said casing and a drawn back position along a right-and-left direction of said main casing.

* * * * *